United States Patent [19]

Lim

[11] Patent Number: 5,504,629

[45] Date of Patent: Apr. 2, 1996

[54] OPTICAL PROJECTION SYSTEM WITH A NOVEL LENS SYSTEM

[75] Inventor: Dae-Young Lim, Seoul, Rep. of Korea

[73] Assignee: Daewoo Electronics Co., Ltd., Seoul, Rep. of Korea

[21] Appl. No.: 367,362

[22] Filed: Dec. 30, 1994

[30] Foreign Application Priority Data

Jan. 18, 1994 [KR] Rep. of Korea .................... 94-785

[51] Int. Cl.⁶ .................... H01L 27/14; G03B 21/00; G03B 21/28
[52] U.S. Cl. .................... 359/850; 359/851; 359/891; 359/855; 353/99
[58] Field of Search .................... 359/850, 851, 359/883, 884, 889, 892, 893; 353/99, 37, 122; 355/53

[56] References Cited

U.S. PATENT DOCUMENTS 4,111,538  9/1978  Sheridon .................... 353/122
5,056,912  10/1991  Hamada et al. .................... 353/38
5,140,396  8/1992  Needham et al. .................... 357/30
5,379,081  1/1995  Kim et al. .................... 353/99

Primary Examiner—Paul M. Dzierzynski
Assistant Examiner—Mohammad Y. Sikder
Attorney, Agent, or Firm—Anderson Kill Olick & Oshinsky

[57] ABSTRACT

An optical projection system, capable of displaying an M×N number of pixels and having a reduced optical path and hence a reduced size, wherein M and N are integers, comprises a non-point light source, an array of M×N actuated mirrors, a projection screen, a projection lens and a lens system including a first lens unit, a second lens unit and an optical baffle located therebetween, wherein the optical baffle is provided with a plurality of apertures and light absorbing regions, each of the lens units includes an array of M×N microlenses.

1 Claim, 2 Drawing Sheets

OPTICAL PROJECTION SYSTEM WITH A NOVEL LENS SYSTEM

FIELD OF THE INVENTION

The present invention relates to an optical projection system; and, more particularly, to an optical projection system having a reduced optical path and hence a reduced size.

BACKGROUND OF THE INVENTION

Among the various video display systems available in the art, an optical projection system is known to be capable of providing high quality displays in a large scale.

In FIG. 1, there is illustrated a prior art optical projection system 100 comprising a non-point light source 1, an optical baffle 2 provided with a plurality of reflective surfaces and corresponding number of slits, an array 3 of M×N actuated mirrors 4, a focussing, a projection and a collimating lenses 6,7,8, and a projection screen 9. Such an optical projection system is more fully described in a copending, commonly assigned application, U.S. Ser. No. 08/220,799, entitled "Optical Baffling Device" and is incorporated by reference herein. In such a system, light emanating from the non-point light source 1 is focussed along a first optical light path 10 onto the reflective surfaces of the optical baffle 2 by the focussing lens 6. The reflective surfaces of the optical baffle 2 are in a facing relationship with the focussing lens 6 and the collimating lens 8. The light beam reflected from each of the reflective surfaces diverges along a second optical path 11 and quasi-collimated by the collimating lens 8, thereby being uniformly illuminated onto the array 3 of M×N actuated mirrors 4, each of the actuated mirrors 4 corresponding to each of the pixels to be displayed. The optical path of the reflected light from each of the actuated mirrors 4 is determined by the amount of deflection thereof. The reflected light beam from each of the undeflected actuated mirrors are focussed back to the optical baffle 2 by the collimating lens 8 along a second optical path 11 and stopped by the reflective surfaces thereof, whereas the reflected light beams from each of the deflected actuated mirrors are focused by the collimating lens 8 along a third optical path 12 so that a portion of the focused light beam passes through the slits thereof. The light beams from each of the actuated mirrors 4 which pass through the slits are transmitted to the projection lens 7 which focuses the transmitted light beam from each of the actuated mirrors 4 on the projection screen 9, thereby displaying each of the pixels corresponding thereto.

One of the major drawbacks of the above-described optical projection system its size and applicability. The size of the optical projection system depends on the length of the optical path of the light beam. For example, the light beam emanating from the light source is collimated by the collimating lens 8 in order for it to be uniformly illuminated onto the array 3 of M×N actuated mirrors 4, and the collimating lens used for such a purpose, conventionally, is provided with a long focal length. The longer the focal length is, the longer the optical path of the light beam will be, and, hence, the larger the size of the system will be.

Furthermore, the above-described optical projection system can be used for a projection type display only, thereby limiting its overall applicability.

SUMMARY OF THE INVENTION

It is, therefore, a primary object of the present invention to provide an optical projection system with a reduced optical path and hence a reduced size.

In accordance with the present invention, there is provided an optical projection system capable of displaying an M×N number of pixels, wherein M and N are integers, comprising: a non-point light source for emitting light beams; an array of M×N actuated mirrors, each of the actuated mirrors including an actuator and a mirror; a projection screen; a projection lens; and a lens system including a first lens unit, a second lens unit and an optical baffle located therebetween, the optical baffle being provided with a plurality of apertures and light absorbing regions, each of the lens units having a pair of sides that are parallel with an array of M×N microlenses formed on one of the parallel sides, and the side without the array of M×N microlenses formed thereon from each of the lens units facing each other, each of the M×N microlenses having a focal length and a corresponding focal point at which each of the apertures of the optical baffle is located, and each of the mirrors on the array of M×N actuated mirrors being in an optical alignment with each of the apertures of the optical baffle, wherein each of the M×N microlenses in the first lens unit is used for focussing the light beams emanating from the light source onto each of the apertures of the optical baffle located on its focal point, each of the M×N microlenses in the second lens unit for collimating the light beams passed through each of the apertures of the optical baffle to thereby illuminate them uniformly onto each of the mirrors on the array of M×N actuated mirrors, each of the mirrors on the array of M×N actuated mirrors for reflecting the light beams from each of the microlenses on the second lens unit and causing a deviation in the optical path of the light beams from each of the microlenses on the second lens unit reflected therefrom by changing its relative position to the light beams from each of the microlenses on the second lens unit in response to an electrical signal applied to the corresponding actuator, each of the M×N microlenses in the second lens unit for refocussing the reflected light beams from each of the mirrors on the array of M×N actuated mirrors onto each of the apertures of the optical baffle, to thereby allow the optical baffle to modulate the intensity of the light beams, and each of the M×N microlenses in the first lens unit for collimating the reflected light beams from the optical baffle onto the projection lens which, in turn, focuses the light beams onto the projection screen, thereby displaying an image thereon.

BRIEF DESCRIPTION OF THE DRAWINGS

The present invention together with the above and other objects and advantages will become apparent from the following description of preferred embodiments given in conjunction with the accompanying drawings, wherein.

DETAILED DESCRIPTION OF THE PREFERRED EMBODIMENTS

Figure 1:
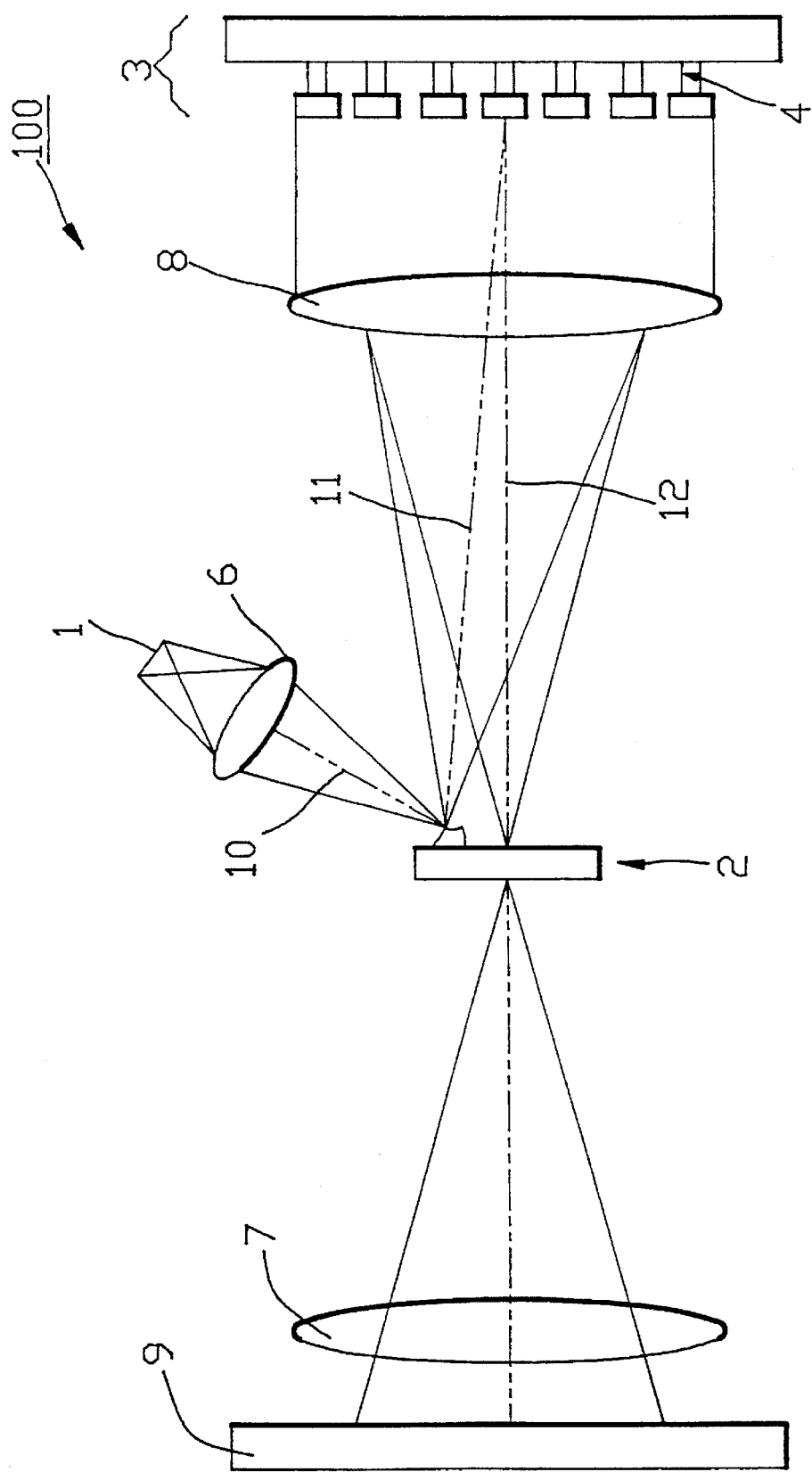
FIG. 1 represents a schematic view of a prior art optical projection system.
Figure 2:
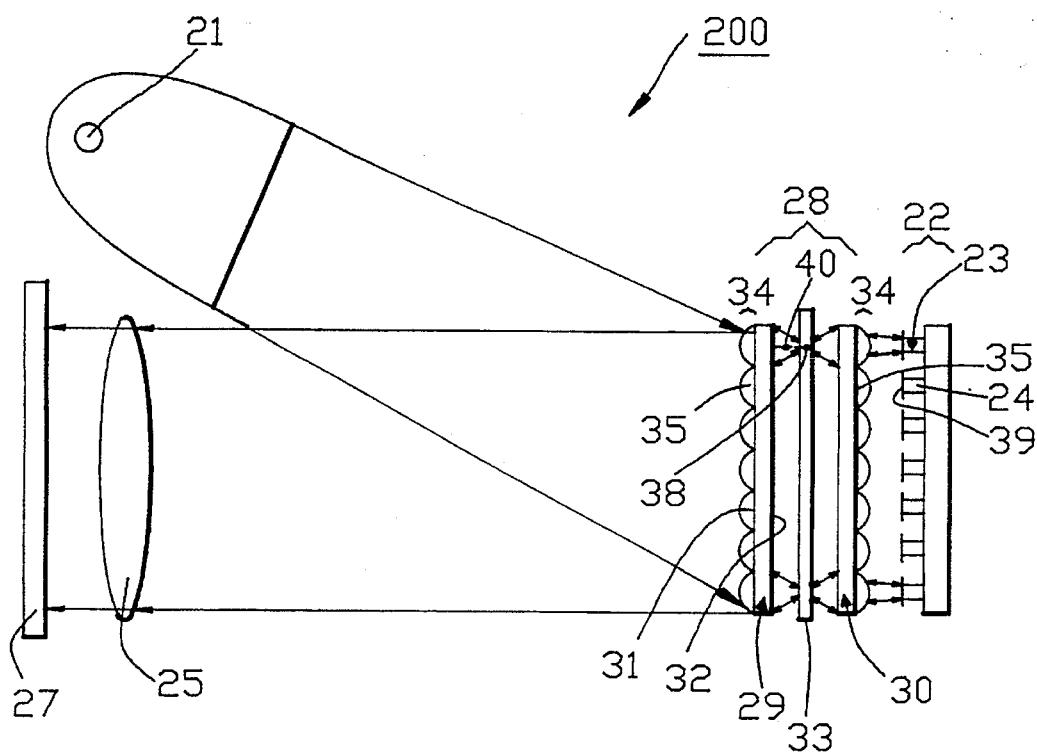
FIG. 2 illustrates a schematic view of an optical projection system in accordance with a preferred embodiment of the present invention.

There is illustrated in FIG. 2 a schematic view of an optical projection system 200 in accordance with the preferred embodiment of the present invention comprising a non-point light source 21, an array 22 of M×N actuated mirrors 23, each of the actuated mirrors 23 having an actuator 24 and a mirror 39, a projection screen 27, a projection lens 25 and a lens system 28 including a first lens unit 29, a second lens unit 30 and an optical baffle 33 located therebetween. Each of the first and second lens units 29,30 is further provided with a pair of side surfaces 31,32 that are parallel with an array 34 of M×N microlenses 35 formed on one of the parallel side surfaces, and the side surface without the array 34 of M×N microlenses 35 formed thereon from each of the lens units 29,30 facing each other, and each of the microlenses 35 on the arrays on the first and second lens units 29,30 having a focal length 40 and a focal point 38.

Figure 3:
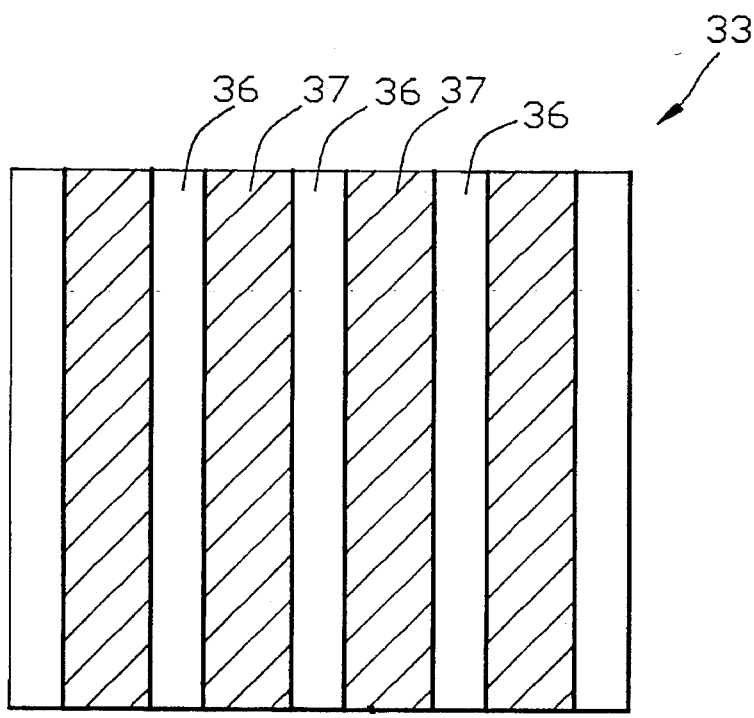
FIG. 3 offers a plan view of a baffle used in the inventive optical projection system.

The optical baffle 33 consists of a plurality of apertures 36 and light absorbing regions 37 as shown in FIG. 3, wherein the optical baffle 33 is placed between the two lens units 29, 30 in a such a way that the apertures 36 thereof coincide with the focal point 38 of each of the M×N microlenses 35 in the array 34 on the first lens unit 29 and the combined total area of the apertures 36 is equal to or less than that of the light absorbing regions 37. A light emanating from the non-point light source 21 is focused onto the optical baffle 33 by the array 34 of M×N microlenses 35 on the first lens unit 29. The light beam from the optical baffle 33, then, is collimated by the array 34 of M×N microlenses 35 on the second lens unit 30 and is illuminated onto the array 22 of M×N actuated mirrors 23. The actuators 24 are made of an electrodisplacive material such as a piezoelectric or an electrostrictive material which deforms in response to an electrical signal applied thereto. The reflected light beams from the actuated mirrors 23 in the array 22 are focused back onto the optical baffle 33 by the array 34 of M×N microlenses 35 on the second lens unit 30. Each of the mirrors 39 in the array 22 of actuated mirrors 23 is in optical alignment with the apertures 36 of the optical baffle 33. By applying an electrical signal to each of the actuators 24, the relative position of each of the mirrors 39 to the incident light beam is altered, thereby causing a deviation in the optical path of the reflected beam from each of the mirrors 39. As the optical path for each of the reflected beam is varied across the light absorbing portions 37 and the apertures 36 of the optical baffle 33, the amount of light reflected from each of the mirrors 39 which passes through the apertures 36 of the optical baffle 33 is changed, thereby modulating the intensity of the beam. The modulated beams through the apertures 36 are collimated by the array 34 of M×N microlenses 35 in the first lens unit 29 and transmitted onto the projection screen 27 via an appropriate optical device such as the projection lens 25, thereby displaying an image thereon.

In such an optical projection system, the brightness of a spot image om the projection screen 27 depends on the amount of light passing through the apertures 36 of the optical baffle 33, which in turn is controlled by the deformation of each of the actuators 24.

The size of the optical projection system is proportional to the length of the optical path of the light beam. The inventive optical projection system 200, as described above, employs a pair of the arrays 34 of M×N mircolenses 35 for focussing the light beam emanating from the light source 21 on to the optical baffle 33 and then collimating the light beam from the optical baffle 33 onto the array 22 of M×N actuated mirrors 23. Since each of the microlenses 35 has a focal length which is much less than that of the collimating lens 8 used in the prior art optical projection system 100, this will result in a reduction in the length of the optical path of the light beam, and hence a reduction is the overall size of the system.

While the present invention has been described with respect to certain preferred embodiments only, other modifications and variations may be made without departing from the scope of the present invention as set forth in the following claims.

What is claimed is:

1. An optical projection system capable of displaying an M×N number of pixels, wherein M and N are integers, comprising:

a non-point light source for emitting light beams;

an array of M×N actuated mirrors, each of the actuated mirrors including an actuator and a mirror:

a projection screen;

a projection lens; and a lens system including a first lens unit, a second lens unit and an optical baffle located therebetween, the optical baffle being provided with a plurality of apertures and light absorbing regions, each of the apertures in the optical baffle being separated by a pair of light absorbing regions on either side thereof, the combined total area for each of the light absorbing regions being equal or greater than that of the apertures, each of the lens units having a pair of sides that are parallel with an array of M×N microlenses formed on one of the parallel sides, and the side without the array of M×N microlenses formed thereon from each of the lens units facing each other, each of the M×N microlenses having a focal length and a corresponding focal point at which each of the apertures of the optical baffle is located, and each of the mirrors on the array of M×N actuated mirrors being in an optical alignment with each of the apertures of the optical baffle, wherein each of the M×N microlenses in the first lens unit is used for focussing the light beams emanating from the light source onto each of the apertures of the optical baffle located on its focal point, each of the M×N microlenses in the second lens unit for collimating the light beams passed through each of the apertures of the optical baffle to thereby illuminate them uniformly onto each of the mirrors on the array of M×N actuated mirrors, for reflecting the light beams from each of the microlenses on the second lens unit and causing a deviation in the optical path of the light beams from each of the microlenses on the second lens unit reflected therefrom by changing its relative position to the light beams from each of the microlenses on the second lens unit in response to an electrical signal applied to the corresponding actuator, each of the M×N microlenses in the second lens unit for refocussing the reflected light beams from each of the mirrors on the array of M×N actuated mirrors onto each of the apertures of the optical baffle, to thereby allow the optical baffle to modulate the intensity of the light beams and each of the M×N microlenses in the first lens unit for collimating the reflected light beams from the optical baffle onto the projection lens which, in turn, focuses the light beams onto the projection screen, thereby displaying an image thereon.

* * * * *